United States Patent Office 3,107,679
Patented Oct. 22, 1963

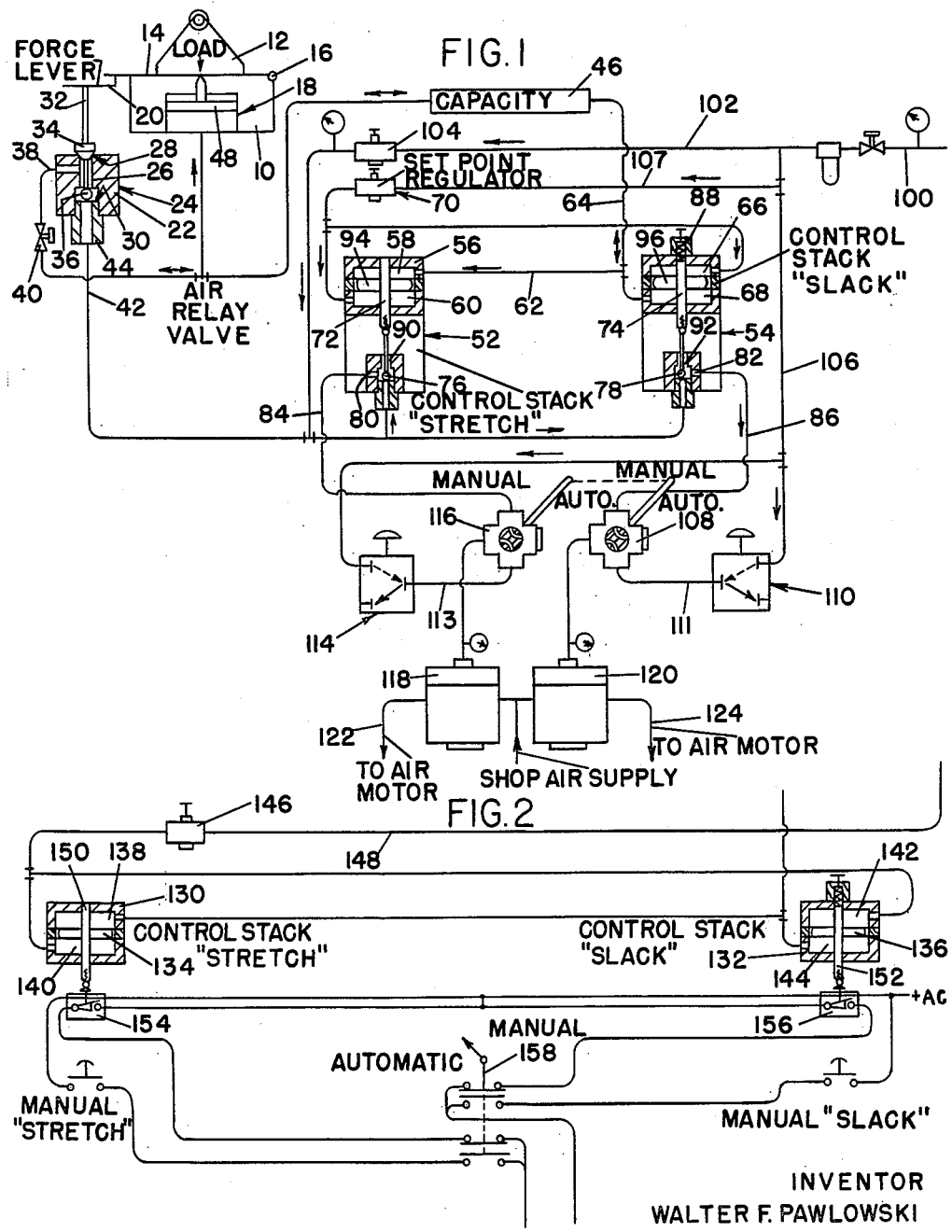

3,107,679
AUTOMATIC TENSION CONTROL DEVICE
Walter F. Pawlowski, Box 123, Holbrook, Mass.
Filed June 5, 1961, Ser. No. 114,749
12 Claims. (Cl. 137—85)

This invention relates to an automatic control device for application to webs or strands of material wherever encountered in industrial processes and machines and wherein the maintenance of constant tension is desired. Reference is made to my U.S. Patent No. 2,922,594 dated January 26, 1960, and my pending patent application Serial No. 582,193 filed May 2, 1956, now U.S. Patent No. 2,988,297, wherein a tension sensing device supports a web handling idler roll and functions as a control balancing a tension reference against a tension measurement.

The present invention differs in that prior devices strive to effect a modulated control and are thereby called into continuous control action which is undesirable for certain applications. The present invention is specific for application to tension maintenance on continuous belt applications such as are found in the maintenance of wire tension on certain paper making machinery, the wire being essentially an endless belt upon which initial paper formation and transport take place. Under stable operating conditions, such wires suffer a relatively slow change of length as a consequence of use, and tensioning adjustments are required infrequently, possibly once a day if conditions remained unchanged. However, changing wire length due to temperature and forces due to horsepower input encountered during operational speed changes upset tension balance and requires corrective action at unpredictable though relatively infrequent intervals.

The ideal system is sensitive to reasonably small errors in tension and stands ready to take the necessary corrective action, but remaining completely inoperative so long as operating tension remains within acceptable limits. These requirements are dictated by the fact that such tensioning devices must utilize stretch rolls in the same way that idlers are used to maintain drive belt tensions, and precise actuation mechanisms must be employed in order to maintain perfect roll alignment; otherwise, at high linear speeds the wires slide across the face of any misaligned roll and may be destroyed upon coming in contact with end frame mountings. A minimum of actuation and consequent wear on such equipment is therefore highly desirable.

Another field of application wherein the present controller device provides noteworthy performance is in typical reeling and unreeling applications requiring constant tension control which utilize various mechanical and frictional power transmission and braking devices for mechanical maintenance. Whenever one of these control elements is defective and exhibits a dead-spot in the control response, a standard modulating controller will hunt excessively and the performance is worse than can be obtained under manual operating conditions.

The present invention provides an apparatus that remains inactive and responds only when conditions deviate beyond set limits which are adjustable and is thereby able to accommodate a reasonable amount of malfunction in such devices and thereby render acceptable automatic control performance which would otherwise not be obtainable.

The invention further relates to arrangements and combinations of parts which will be hereinafter described and more particularly set forth in the appended claims.

Reference is to be had to the accompanying drawings, in which

FIG. 1 is a diagram illustrating the invention applied to operate fluid valves, and FIG. 2 is a similar diagram with parts omitted, showing the invention applied to operate electric switches.

A suitable housing 10 mounts or carries mechansm which may be generally designated as the "transmitter." A superimposed load sensing device 12 may be mounted upon a load carrying plate 14 which is pivotally supported as at 16 in or on housing 10. This load carrying plate is balanced from beneath by means of an air cylinder or diaphragm generally indicated at 18. An imbalance of forces causing an upward or downward motion is transferred by means of a force lever 20 to an air relay valve 22 of particular design.

The air relay valve 22 comprises in general a housing 24 having a passage 26 therein which provides an upper seat 28 and a lower seat 30, the latter being formed by a shoulder. There is a valve pin 32 which is provided with a valve member 34 and there is a ball 36 for cooperation with respective valve seats 28 and 30. An outlet 38 is provided with an adjustable restriction at 40 and the inlet pipe from the shop air or other source of pressure is indicated at 42 being connected through a fixture 44.

This air relay valve is of three-way operation. A downward force on valve pin 32 opens the lower seat 30 and provides for transmission of air pressure to the output pipe line 38. Meantime the upper seat 28 is simultaneously closed a proportionate amount thereby shutting off the venting action. An upward motion of the actuating valve pin 32 allows the air supply at 42 to force the ball 36 against the seat 30 shutting off further forward air flow, and simultaneously opens the upper valve seat 28 causing the pressure existing in the output pipe line to be exhausted to atmosphere via the vent.

The output line 38 of this valve is piped via the adjustable restriction 40 for purposes of modulating the sensitivity, to a surge tank 46 and the under side of the transmitter or force piston or diaphragm 48. The output side of the valve leading via the surge or capacity tank ultimately terminates in a closed system, thereby permitting pressurization of the line whenever sustained downward forces hold the air relay valve open. Thus downward loads on the tension sensing transmitter will cause the air relay valve to feed back an output air signal to the under side of the diaphragm 48 and tend to rebalance the loading with an upward force.

When the upward force exceeds the downward loading by the slight amount dictated by mechanical conditions of the assembly, an upward motion will take place and terminate the air delay valve output. Thus with the restriction operable in the line, this circuitry thus far described acts to fed back and continuously rebalance with minor error momentarily sustained load changes acting on the transmitter whether they be of increased or decreased value. The air pressure acting on the force piston is therefore a direct linear measurement of actual super-imposed load on the transmitter.

It is axiomatic that if a variable can be measured it can usually be controlled. The remainder of the circuitry operates in combination with the foregoing measurement to effect automatic control performance of the quality previously discused as being desirable. In order to obtain a static control which will be called into operative condition only when the variable deviates beyond prescribed limits upwardly or downwardly, the system is arranged to split control action as being in either the forward or reverse direction and specifically because the final control element is designed to be a reversible device such as a two-way air motor, although it could also be done with electrical modifications with a reversible electric drive. This is occasioned by the fact that such positive drives cannot be in continuous operation in either the positive or negative direction (not subject to modulation) without ultimately exceeding permissible values, and that any control which would so permit this performance must therefore "hunt" and continuously recorrect upward and downward thereby resulting in excessive wear, undesirable deviation, and excessive consumption of the power sources.

The control action is split by means of control stacks which are two-chambered force-balance assemblies generally indicated at 52 and 54. These are much alike.

The assembly or control stack 52 (stretch stack) comprises a housing 56 having an upper chamber 58 and a lower chamber 60. Chamber 58 is connected to a line 62 in turn connected to the surge or capacity tank 46 as by a line 64. The control stack or assembly 54 (slack stack) is also provided with two chambers 66 and 68 respectively, lower chamber 68 being connected to surge or capacity tank 46 by a line 64. Slack stack 52 has its upper chamber 58 so connected. The opposite chambers, i.e., 60 and 66 respectively, are connected with respect to a set point regulator generally indicated at 70.

Each control stack is provided with a similar actuator pin 72, 74. Each pin has an internal ball valve member 76, 78 and an outlet at 80, 82 respectively leading to lines 84 and 86 respectively. The pin 74 is provided, however, with a spring bias adjustment device at 88. The pins 72 and 74 provide vents as at 90 and 92. The reference numerals 94 and 96 represent diaphragms connected to the pins 72 and 74 by means of which the latter are moved upwardly and downwardly according to air pressure or lack of it in the respective chambers 58, 60, 66 and 68. The areas of these diaphragms must be equal.

Opposite chambers in each of these units (upper chamber of one and lower chamber of the other) are loaded with measurement output of the transmitter assembly through the surge tank 46 and the opposing chambers of each unit are amenable to pneumatic loading by manual adjustment of the set point regulator 70.

The assemblies of control stacks are of such sensitive design that a very minute difference in the opposing pressure values will cause internal motion of the control stack assembly pins 72 and 74 upward or downward. The three-way pneumatic air relay valves described are reverse-acting as compared to the direct-acting type illustrated at 22. Downward motion of pins 72 and 74 will seal off any forward air flow to line 84 and 86 respectively and exhaust the air line at vents 90 and 92 and upward motion will reverse this action.

The construction illustrated beyond the air relay valves of the control stacks serve to amplify the signals of these devices and provide for manifolding means to isolate the automatic circuitry and provide for manual operation.

It will be seen that the shop air source is initiated in the diagram at the line 100 and the usual pressure valve stop cocks, air filters, etc. are employed. The line 100 extends through line 102 to the adjustment regulator 104 and thence to the line 42 and it also branches through a line 106 to three-way pilot valves generally indicated at 110 and 114 which are connected by lines 111 and 113 to selector valves 108 and 116. These valves act together and simultaneously serving to direct the output of valves 110 and 114 to regulator valves 118 and 120 respectively for manual control, or else to direct the output of stacks 52 and 54 to valves 118 and 120 when placed on automatic. The valve 108 is of well known design and merely operates to cut the slack control 54 in or out as to automatic or manual control thereof. Line 100 also extends through line 107 to the set point regulator 70.

In operation, if the set point adjustment at 70 is slightly less than the actual tension measurement from the transmitter (diaphragm), the control stack 52 (stretch stack) will internally assume a downward motion and close the output of the associated air relay valve. On the control stack 54 (slack stack) the output will be closed by downward motion as a consequence of the biasing spring force plus the set point force. The system is thereby in a standby status ready to respond to some measure of tension error which is essentially the force set in by the spring bias 88 on the slack control stack 54. Obviously, the spring bias could have been placed on the opposite stack but would have to have been acting with an upward tension force rather than downward compression as is now the case.

Upon an increase in tension, the tension measurement acting downward will continue to hold the stretch (52) signal cut off but by acting on the underside of the slack control stack 54 will overcome the spring bias and open the air relay valve resulting in a forward flow of air. This forward flow is then directed by way of the automatic-to-manual selector valve (when positioned in automatic) to the top of the respective air regulator valve 120 and thereby acts as a pilot to transmit full line pressure via that device to the final control element, typically e.g. an air-motor being driven in the proper direction to introduce slack in the wire or belt, see the diagram at lines 122 and 124.

Upon again achieving the required tension in the "belt," the transmitted measurement will decrease and the "slack" control stack will return to an "off" condition.

If the tension were to decrease below the set point value, the set point pressure would continue to hold the slack control stack shut; but by acting on the under side of the stretch control stack this would result in upward motion of the pin and an output signal which would once again (by means of the selector valve in automatic position) be relayed to the other air operated regulator valve 118 which would drive the air motor in the reverse direction. Consequent correction of the wire tension would restore the state of balance and shut off the stretch control stack and with adequate spring bias on the slack control stack the correction would carry the tension into the dead zone and operation would again become static. Adjustment range of the spring bias provides for gearing, motor speeds, etc. which might vary from installation to installation and could introduce some slight coasting or overshooting of the normally desired set point. This setting is therefore determined by the characteristic of the drive train of the final control element.

In FIG. 2, the invention is the same, but illustrates how it can be used to operate electric switches rather than the fluid control valve shown in FIG. 1. The stacks are essentially the same as before including housings 130, 132 having diaphragms 134, 136 forming chambers 138, 140, 142, 144, there being a settable regulator 146 connecting the fluid source 148 to the chambers 140 and 142 respectively. The chambers 138 and 144 are connected to a variable fluid source as before, and there are plungers 150 and 152 connected to the respective diaphragms for respective actuation according to the variable fluid signal, and plunger 152 is provided with an adjustable spring bias for reasons given above as to the equivalent structure of FIG. 1. The difference in FIG. 2 resides in the switches 154, and 156, of any suitable sort, for controlling the torque variation controlled in FIG. 1 by fluid valves. These switches can be placed in manual or automatic by the double switch 158.

It is to be understood that instead of air motors, etc., this system just as easily can control pneumatic pressure switches, cut-off valves, brakes, clutches, etc. Furthermore, various auxiliary mechanisms such as electrical switches can be controlled and also various kinds of safety over-ride circuits can be employed without departing from the scope of the invention.

Having thus described my invention and the advantages thereof, I do not wish to be limited to the details herein disclosed, otherwise than as set forth in the claims, but what I claim is:

1. An automatic control device comprising a source of fluid pressure, a load detector, fluid valve means actuated by the load detector, a pair of double chamber balance detecting devices each of which includes a housing and an intermediate movable partition in each housing forming two variable chambers in each housing, a control rod fixed to each partition and adjustable spring bias means associated with one such control rod, a regulator means connecting the fluid source to one chamber of each of said double chamber balance detecting devices, and means connecting the output of the fluid valve means to the opposite chambers of the respective double chamber balance detecting devices for actuation of one or the other of said control rods, and a subsidiary control device associated with and operated by each control rod.

2. The automatic control device of claim 1 wherein the subsidiary control devices each include an electric switch.

3. The automatic control device of claim 1 wherein the subsidiary control devices each include a fluid operated valve.

4. The automatic control device of claim 1 including means to adjust the fluid pressure transmitted to the respective chambers of the balance detecting devices by the regulator.

5. The automatic control device of claim 1 wherein the spring bias provides an interval resisting actuation of the plunger to which the spring is connected.

6. The automatic control device of claim 1 wherein the partitions are diaphragms.

7. An automatic control device for directional control of a mechanism for selected automatic increased or decreased action according to a signal, said automatic control device comprising a source of fluid pressure, a pair of double chamber balance detecting devices each of which includes a housing for the chambers, an intermediate movable partition in each housing forming the two chambers therein, a control rod fixed to each partition, an adjustable spring bias means associated with one control rod, a subsidiary control device connected with and operated by each control rod, a regulator connecting the fluid source to one chamber of each said balance detecting devices, a signal means comprising a variable source of fluid pressure connected to the opposite chambers of the respective balance detecting devices for actuation of one or the other of said control rods and thereby of the respective subsidiary control devices.

8. The automatic control device of claim 7 wherein the subsidiary control devices include an electric switch.

9. The automatic control device of claim 7 wherein the subsidiary control devices include a fluid operated valve.

10. The automatic control device of claim 7 including means to adjust the fluid pressure transmitted to the respective chambers of the balance detecting devices by the regulator.

11. The automatic control device of claim 7 wherein the spring bias provides an interval resisting actuation of the plunger to which the spring is connected.

12. The automatic control device of claim 7 wherein the partitions are diaphragms.

References Cited in the file of this patent

UNITED STATES PATENTS

| 752,491 | Wairen | Feb. 16, 1904 |
| 2,297,975 | Morin et al. | Oct. 6, 1942 |
| 2,489,450 | Crookston | Nov. 29, 1949 |
| 2,880,705 | Schneider | Apr. 7, 1959 |
| 2,942,581 | Gaffney | June 28, 1960 |

FOREIGN PATENTS

| 1,096,531 | France | Feb. 2, 1955 |